United States Patent [19]

Zahid

[11] 4,344,458

[45] Aug. 17, 1982

[54] ACCUMULATOR DEVICE WITH IMPROVED BLADDER SEAL

[75] Inventor: Abduz Zahid, Los Angeles, Calif.

[73] Assignee: Greer Hydraulics, Incorporated, Los Angeles, Calif.

[21] Appl. No.: 177,795

[22] Filed: Aug. 13, 1980

[51] Int. Cl.³ .............................................. F16L 55/04
[52] U.S. Cl. ...................................... 138/30; 220/85 B
[58] Field of Search ................... 138/26, 30; 220/85 B

[56] References Cited

U.S. PATENT DOCUMENTS 3,211,184 10/1965 Greer .................................... 138/30
3,509,916 5/1970 Mercier ......................... 220/85 B X
3,830,259 8/1974 Mercier ................................ 138/30
3,920,047 11/1975 Mercier ................................ 138/30

*Primary Examiner*—James E. Bryant, III
*Assistant Examiner*—Daniel P. Stodola
*Attorney, Agent, or Firm*—Arthur B. Colvin

[57] ABSTRACT

An accumulator device which incorporates an improved mounting for the bladder assembly. More particularly, there is provided a stem adapted to be secured to the pressure vessel, the stem having a mounting portion to which the mouth of the bladder is bonded, the configuration of the mounting portion and the configuration of the bladder member adjacent the mouth assuring the formation of a tight leakproof gas and oil seal, and augmenting the integrity of the connection between bladder and stem.

2 Claims, 2 Drawing Figures

ACCUMULATOR DEVICE WITH IMPROVED BLADDER SEAL

BACKGROUND OF THE INVENTION

1. Field of the Invention

The present invention is in the field of accumulator devices, and more particularly pertains to an accumulator device intended to be employed in a hydraulic system as a means for dampening pulsations or storing energy.

2. The Prior Art

It is known to employ in a hydraulic system for various purposes, such as pulsation dampening and energy storage, an accumulator device which comprises a pressure vessel having an oil or liquid port adapted to be connected in a hydraulic line. A bladder assembly is disposed within the vessel, access being provided to the interior of the bladder for charging the same with gas under pressure. When the oil pressure exceeds the pressure of the gas charged in the bladder, oil is permitted to enter through the oil port into the interior of the vessel and further compress the gas within the bladder. When the pressure in the hydraulic line falls, the bladder expands and the energy stored in the gas is retransmitted to the hydraulic system.

Numerous means for mounting the bladder within the vessel are in commercial production. In certain instances, the open mouth of the bladder is bonded to an annular ring which, in turn, is welded to the interior walls of the pressure vessel.

In alternative constructions, the retaining ring bonded to the bladder is welded to one half of the pressure vessel and a second weld line completes the formation of the vessel and secures the ring in position.

In still further versions of known accumulators, the open mouth or gas charging opening of the bladder is secured to a stem member, which stem member is, in turn, mounted in a bore formed at one end of the pressure vessel. In devices of the last mentioned type, in order to assure against leak of oil and of gas, complex arrangements of O-rings, clamps and like structures have been required.

A further difficulty inhering in devices heretofore known wherein a mounting stem provides the means for securing the bladder in position, lies in the tendency of the bladder to separate from the stem under operating conditions, with resultant failure of the accumulator.

As examples of stem mounted bladder type accumulators heretofore known, reference is made to U.S. Pat. Nos. 3,230,975 of Jan. 25, 1966; 3,232,318 of Feb. 1, 1966; and 3,920,047 of Nov. 18, 1975.

SUMMARY OF THE INVENTION

The present invention is directed to an improved hydraulic accumulator having mounting means for the bladder which comprises a stem bonded to the bladder and extending outwardly through a bore formed in the gas charging end of a pressure vessel. The configurations of the bladder member and the stem are so constructed and arranged as to provide a secure mounting of the bladder and define a tight sealed arrangement as against oil and gas leakage, without the necessity for employing complex sealing devices such as O-rings, gaskets, clamps or the like.

More particularly, the mounting assembly comprises a bladder having a mouth portion bonded to the lower end of a stem, which is in turn mounted to the pressure vessel. The stem includes at its inner end a stop flange which, in the applied position, engages against the inner surface of the vessel surrounding the bore. The stem, in addition, includes a compression flange of larger diameter than the stop flange, the compression flange including an upwardly directed annular rim.

The mouth of the bladder is bonded into an annular groove defined between the noted flanges, and includes a raised annular bead in its unstressed condition. The bead is located at a radial distance between the rim of the compression flange and the outer periphery of the stop flange, whereby, upon tightening of a jam nut, the bead is stressed inwardly and reacts against the pressure vessel, whereby high compressive forces are exerted, assuring both a tight gas and oil seal surrounding the bore.

It is accordingly an object of the invention to provide a hydraulic accumulator device of the bladder type having a novel mounting arrangement for the bladder, which is inexpensive to produce and yet is effective in providing a durable gas-tight and oil-tight seal adjacent the gas charging end of the accumulator.

To attain these objects and such further objects as may appear herein or be hereinafter pointed out, reference is made to the accompanying drawings, forming a part hereof, in which.

Figure 1:
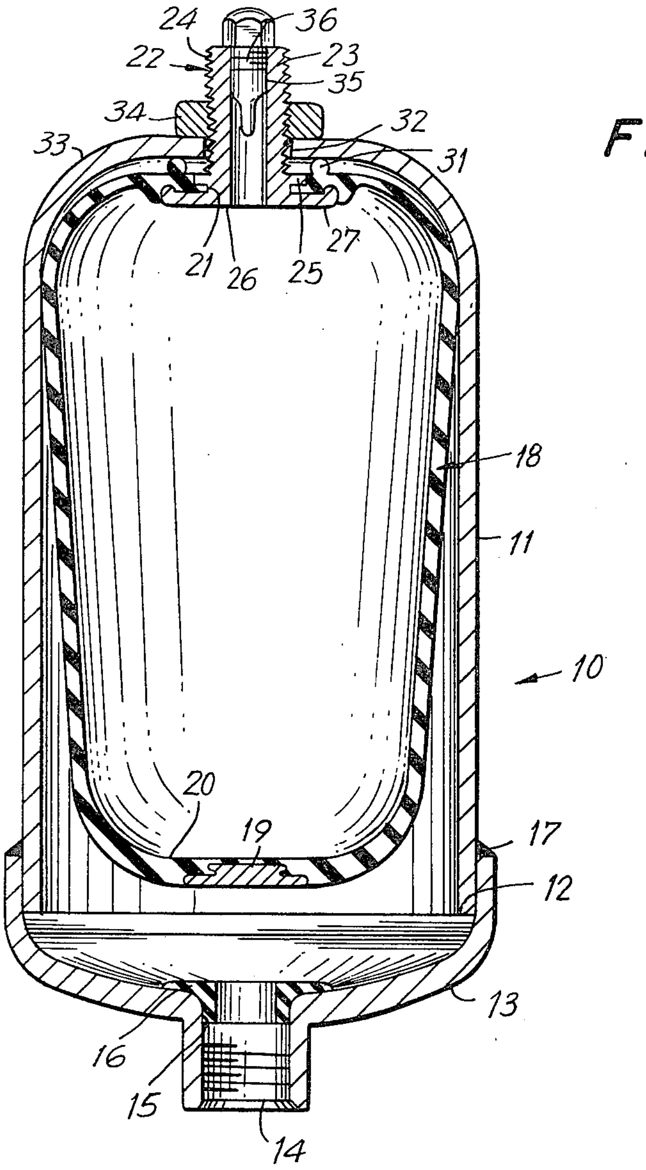
FIG. 1 is a vertical sectional view of an accumulator device in accordance with the invention prior to complete tightening of the bladder supporting mechanism.

Turning now to the drawings there is shown in FIG. 1, a hydraulic accumulator device 10 which includes a pressure vessel formed of an upper section or shell 11 having a downwardly open mouth portion 12. The pressure vessel includes a lower shell section 13 having a nipple or coupling member 14 at the lowermost end thereof, which coupling permits connection of the vessel to the conduit of a hydraulic system.

An oil port 15 is formed at the upper end of the nipple 14, which oil port may include an annular elastomeric or like buffer member 16, known per se, to prevent direct contact of the bladder assembly hereinafter described with metallic portions of the pressure vessel surrounding the oil port 15.

The shell sections 11 and 13 may be connected by an annular weld 17, it being understood, as will be made clear from the ensuing description, that the weld connection 17 is effected after the bladder has been mounted.

The bladder assembly 18, which is shown in FIG. 1 in its unstressed condition, is formed of an elastomeric material, such as Neoprene, and may include a button 19 molded into the material of the bladder assembly adjacent the lower end 20 thereof, the function of the rigid button 19 being to interact with the annular buffer 16 and prevent extrusion of the bladder through the oil port. The bladder assembly 18 includes an open mouth portion 21.

The bladder assembly 18 is connected to a mounting stem assembly 22. The mounting stem 22 includes a generally cylindrical body portion 23 having an external thread 24. A radially extending stop flange 25 is formed on the outer surface of the stem 22 in spaced relation to the innermost end 26 of the stem. A compression flange 27 is formed at the innermost end of the stem, the spaced flanges 25 and 27 defining therebetween an outwardly facing annular groove 28 having substantially parallel planar walls. The outermost periphery of the compression flange 27 includes on its uppermost surface an upwardly directed annular rim 29.

The bladder assembly 18 is connected to the stem assembly 22 by bonding and or molding in situ thereover, the bladder including an inwardly directed annular lip 30 which extends into the groove 28 defined between the vertically spaced flanges 25 and 27.

The bladder assembly includes, in addition, an annular integral bead 31 which, in the unstressed condition of the bladder depicted in FIG. 1, projects upwardly above the level of the stop flange 25. The radial spacing of the bead 31 from the axis of stem 22 is such as to locate the same outwardly of the stop flange 25 but inwardly of the rim portion 29 of the compression flange 27.

The bladder assembly and bonded stem are mounted before the shell halves are welded together, as heretofore noted, by passing the same outwardly through the bore 32 formed in the upper end 33 of the pressure vessel. Thereafter, a jam nut 34 is threaded over the threaded portion 24.

Figure 2:
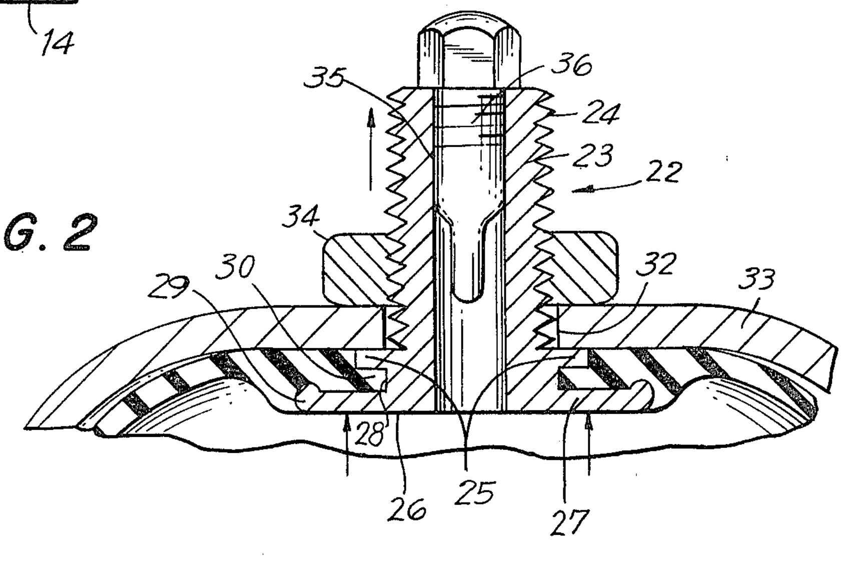
FIG. 2 is a magnified fragmentary sectional view showing the position of the parts after tightening of the bladder.

The parts are shown in FIG. 1 in the lightly tightened position of the nut 34. The assembly is completed by tightening the jam nut 34 to the position shown in FIG. 2 wherein the stop flange 25 is shown clamped against the inner surface of the pressure vessel surrounding the bore 32, the undersurface of the nut 34 reacting against the outer face of the upper end 33 of the pressure vessel.

As a result of such tightening, the upwardly extending bead 31 of the bladder will be stressed downwardly into the space defined between the flanges 25 and 27. The inward compression of the bead will be observed to substantially increase the density of the elastomeric material inwardly of the raised rim 29, with the resultant consequent inward radial and axial forces urging or capturing the bladder components into the space between the flanges. Additionally, an upward compressive force is exerted by the bead 31 against an annular area surrounding the bore 32 in the upper end 33 of the pressure vessel.

It will thus be seen that the compressed bead 31 provides a tight oil seal, between the bladder and pressure vessel guarding against the passage of oil around the bladder and outwardly through the bore. Similarly, the inward gathering forces which result from a flow of the elastomeric material into the annular groove 28 between the flanges 25 and 27 provide a tight gas seal and securely lock the bladder against displacement from the stem.

It will thus be observed that by virture of the configuration of the flanges and the raised bead, there is achieved a synergistic effect, resulting in the bladder being secured against demounting and the simultaneous formation of an effective and permanent oil and gas seal as a result of tightening the jam nut.

In the usual manner, the stem 22 may include an upwardly directed passage 35 in the top of which is mounted a gas charging valve 36, whereby the bladder may be charged with gas under pressure.

From the foregoing, it will be perceived that there is disclosed in accordance with the invention, an accumulator device which is simple in design and provides means for readily mounting the bladder assembly, bonded to a gas charging stem, without the use of O-rings, clamps or other ancillary sealing devices. Tightening of the jam nut not only augments the gas and oil seals but functions, in addition, to secure the bladder against radial displacement from its connection with the supporting stem.

As will be understood by those skilled in the art and familiarized with the instant disclosure, various structural changes may be introduced in the described accumulator device without departing from the spirit of the invention. Accordingly, the invention is to be broadly construed within the scope of the appended claims.

Having thus described the invention and illustrated its use, what is claimed as new and is desired to be secured by Letters Patent is:

1. An accumulator device comprising a pressure vessel having end portions, said vessel including a gas charging port at one end and an oil port at the other end, a bladder assembly mounted in said gas port, said assembly including a stem member having an externally threaded cylindrical body portion extending outwardly through said gas port and a mounting portion within said vessel, said mounting portion including a stop flange in proximate spaced relation to the inner end of said stem and adapted to seal against said one end about the gas port and a compression flange of greater diameter than said stop flange at the inner end of said stem, said compression flange including an upwardly extending annular peripheral rim directed toward said one end, said flanges defining therebetween an annular groove having radially directed substantially parallel upper and lower walls, an elastomeric bladder member including an annular lip extending into, completely filling, and bonded to said groove, said bladder member including an upwardly projecting integral annular bead portion which, in the unstressed condition of said bladder member, projects above said stop flange, the outer diameter of said bead portion being greater than that of said stop flange and less than the diameter of said rim, and a jam nut mounted on said threaded portion of said stem and reacting against the outer wall portions of said vessel surrounding said gas port, said nut clampingly compressing said bead portion into conforming alignment with the inner walls of said vessel surrounding said stop flange and extruding increments of said elastomeric bladder member radially inwardly into said groove increasing the density therein.

2. A device in accordance with claim 1 wherein said elastomeric material in said groove is denser in the clamped condition of said jam nut than in said unstressed condition.

* * * * *